United States Patent Office 3,444,931
Patented May 20, 1969

3,444,931
METHOD OF TREATING CLAY-CONTAINING FORMATIONS WITH GUANIDINE SALT SOLUTION
William B. Braden, Jr., Houston, Tex., assignor to Texaco Inc., New York, N.Y., a corporation of Delaware
No Drawing. Filed Nov. 24, 1967, Ser. No. 685,338
Int. Cl. E21b 43/27, 43/20, 43/22
U.S. Cl. 166—305         18 Claims

ABSTRACT OF THE DISCLOSURE

The invention is directed to a method of treating clay-containing formations to improve and/or restore water permeability by contacting the formation with a guanidine salt in a polar oxygenated aliphatic hydrocarbon solvent such as a lower alkanol or a mixture of such alkanols or dimethylsulfoxide or a mixture of dioxane and dimethylsulfoxide, then contacting the treated formation with an aqueous solution of hydrochloric acid, hydrofluoric acid, fluophosphoric acid or mixtures of such acids. The method is particularly applicable in recovering oil from water sensitive clay-containing formations by water or steam flooding as well as in completion and workover operations.

---

The present invention relates to an improved method for the treatment of clay containing formations. More particularly, this invention relates to an improved method of treating underground formations containing clays or clay like materials to increase the water permeability of the clay and/or to restore the water permeability of clays which have been previously damaged by water so that their water permeability has been materially reduced.

In modern day production of oil from underground formations it has become fairly common practice to apply primary and secondary recovery techniques to an oil containing formation in order to recover the oil therefrom. Among the methods employed in primary recovery operations mention is made of completion and workover techniques and in secondary recovery operations of water flooding, steam injection, gas flooding and combinations thereof. One of the most serious problems encountered in secondary recovery operations with water flooding or steam injection procedures is that the underground oil containing formation also contains clay or clay like bodies associated therewith. Treatment of such a formation with water or steam generally results in swelling of the clay by adsorption of the water with the concomitant result that the water permeability of a formation is materially decreased. The decrease in the permeability of the formation to water results in the loss of the oil contained therein from being recovered by secondary recovery operations.

It is known from U.S. 2,761,843 that clay containing bodies can be stabilized by treatment with substituted ammonium ions derived from basic nitrogen compounds represented by the following general formula:

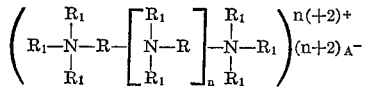

wherein $R_1$ is selected from the group consisting of hydrogen, methyl, ethyl and propyl groups; R is an alkylene group having from 2 to 12 carbon atoms, with the sum of the number of carbon atoms contained in the R groups plus two times the total number of carbon atoms in all $R_1$ groups being at least 6; and $n$ is an integer from 0 to about 100; and A is an anion such as chloride, bromide, iodide, nitrate, lactate, citrate, salicylate, propionate, etc. This patent teaches that guanidine hydrochloride is an unsatisfactory material for use as a treating agent to stabilize clay since clays treated therewith were easily dispersed and resulted in aqueous solutions having a colloidal appearance.

It is also known from the copending, commonly assigned patent application, Ser. No. 515,707, filed Dec. 22, 1965, W. B. Braden, Jr. and J. T. Carlin, now U.S. Patent No. 3,360,043, that clay containing formations can be treated to improve the water and/or steam permeability of the clay by contact with a guanidine salt in a polar oxygenated aliphatic hydrocarbon solvent of prescribed type, namely, a lower alkanol, dimethylsulfoxide, a mixture of dimethylsulfoxide and dioxane or a mixture of lower alkanols.

It has now been found that these clay containing formations can be now effectively treated to improve their water permeability or to restore water permeability by the method of the present invention which comprises treating clay containing formations with a guanidine salt in a polar oxygenated aliphatic hydrocarbon solvent of prescribed type, then contacting the treated formation with a mineral acid of prescribed type.

The improved method of treating water sensitive clay containing formations of the present invention unexpectedly produces beneficial results to the formation that are not attainable by the prior art method or by the method disclosed in the copending, commonly assigned patent application Ser. No. 515,707, now U.S. Patent No. 3,360,-043.

The prescribed class of guanidine salts useful in the present invention include the hydrogen halides such as guanidine hydrochloride and guanidine hydrobromide, or guanidine nitrate, guanidine acetate and mixtures thereof.

The method of the present invention has particular applicability in primary as well as secondary recovery operations wherein water flooding or steam injection is employed as the driving force to recover the oil from the formation. In such primary and secondary recovery operations for example by water flooding the injection water is introduced into the formation under pressure and forced out into the oil containing formation. The pressure maintained on the water injected into the formation displaces or forces the oil to move toward the well bore where the driven oil is recovered by conventional means. In secondary recovery operations the injection fluid is injected into an injection well and the oil recovered from a production well.

In carrying out the method of the present invention in either primary or secondary recovery operations it has been found desirable to inject the prescribed class of guanidine salts in the specified polar oxygenated aliphatic hydrocarbon solvent into the formation from the well bore or from the injection well to stabilize the clay materials in contact with the treating solution. Then the acidizing solution can be injected into the formation to further stabilize same and to increase permeability. Alternatively, a water treatment step can intervene between the guanidine salt treatment and the acid treatment. Thereafter the primary completion or workover fluid or the secondary recovery injection fluid can be introduced into the formation in a conventional manner which is well known in the art to recover the oil. If the permeability of the formation to the injection fluid is reduced as is evidenced by a reduction in the flow of recovered oil the flow of injection fluid is discontinued. There is again introduced into the well the treating solution of the present invention, guanidine salt followed by acid solution, in an amount sufficient to restore the permeability of the formation to the injection fluid. This restoration treatment is carried out in the same manner as described hereinabove. Subsequent to the restoration treatment the injection fluid flow into the well bore or the injection well can be initiated again.

The concentration of the prescribed class of guanidine salts in the polar oxygenated aliphatic hydrocarbon solvent can vary from about 0.5% up to about 65% by weight, dependent on salt solubility in the solvent, but for the most satisfactory results a concentration between about 5% and about 20% has been found to be most effective. Employment of the prescribed class of guanidine salts in a concentration of below about 0.5% is impractical since relatively large amounts of such a dilute treating solution would be required to bring the guanidine salt treating agent into contact with the clay in the formation so as to increase the permeability. Concentrations above about 25 to 30% are impractical also from a cost basis as no improvement in permeability is attained by use of such high concentrations. A preferred concentration for the preferred salt, guanidine hydrochloride, is from about 5% to about 20% by weight. In the treatment of the underground formation by the present invention methanol has been found to be the most effective solvent since it is relatively low in cost and easily available.

The acidizing solution used in the method of the present invention is an aqueous solution of hydrochloric acid or hydrofluoric acid or fluophosphoric acid or a mixture of hydrochloric and hydrofluoric acids. The acid concentration may vary from about 10% to about 30% when one acid is used and from about 3 to about 30% when a mixture of acids are employed. Higher concentrations do not result in a significant improvement and lower concentrations are not as effective in a reasonable period of time.

It has been found that hydrochloric acid at a concentration of 10–30% by weight yields satisfactory results. Mixtures of from 3 to 10% hydrofluoric acid and from 15 to 30% by weight of hydrochloric acid are also satisfactory.

The sequence of treating steps in the present invention plays an important part in the unexpected results obtained thereby. By employing the guanidine salt in prescribed solvent treatment of the formation first one is able to initiate injection by water or steam flooding and by following up with the acid treatment step to improve the permeability of the clay-containing formation.

The preferred treatment procedure is guanidine salt in a lower alkanol, water, acid, water and then followed up with a second treatment of guanidine salt in the alkanol, although one may eliminate either of the water treating steps.

Following is a description by way of example of the method of the present invention.

Example 1

A core was obtained from a bore hole at a depth of 3586–3587 feet in Kyote Field, Atascosa County, Tex. A typical mineralogical analysis of the formation is as follows.

| Mineral: | Percent, wt. |
|---|---|
| Chlorite | 1 |
| Montmorillonite | 5 |
| Mica and illite | 5 |
| Kaolinite | 5 |
| Quartz | 60 |
| Feldspar | 21 |
| Calcite | 3 |

A portion thereof in the form of a plug having a pore volume of 1.5 ml. was removed from the core. The water permeability of the plug to 10% by weight sodium chloride in distilled water was found to be 0.44 millidarcies (md.).

There was injected into the plug 85 pore volumes of a 10% by weight solution of guanidine hydrochloride in methanol. The plug permeability was found to be 132% of the original permeability to the brine solution.

There was injected into the treated plug 225 pore volumes of distilled water and the permeability again determined. It was found to be 93% of the original permeability (a decrease of 39 percentage points from the permeability after treatment with guanidine hydrochloride).

The plug was then treated by injecting into it 26.3 pore volumes of 15% by weight of aqueous hydrochloric acid. Thereafter the plug was treated by injection of distilled water. After about 40 pore volumes of water were injected the permeability was found to be about 275% of the original permeability, and after a total of about 70 pore volumes of water, the permeability was 305% of the original permeability. After a total of 340 pore volumes 308% and after a total of 667 pore volumes, the permeability was 261% of the original permeability. A second treatment of the plug by injection of 10 pore volumes of a 10% by weight solution of guanidine hydrochloride in methanol increased the permeability to 395% of the original permeability and after a total of 90 pore volumes of guanidine hydrochloride had been injected in this second treatment the permeability was found to be 320% of the original permeability. A follow-up treatment with distilled water injection was made on the treated plug. After injection of 50 pore volumes of water the permeability was 287% of the original, and after a total of 537 pore volumes, the permeability amounted to 308% of the original permeability.

It was also found that the porosity of the plug had been increased from 23.7% to 30.1% by this method of treatment.

Example 2

A field trial was conducted to demonstrate the effectiveness of the treating method of the invention. A well in the Kyote Field, Atascose County, Texas. was used. The well had been worked over prior to the test.

A treating solution comprising 5% by weight quanidine hydrochloride in methanol was injected into the well A in an amount of 72.5 barrels at a rate of 606 barrels per day and at a pressure of 685 p.s.i. Thereafter 73.5 barrels of very low salinity field water were injected at a pressure of 325 p.s.i. and at a rate of 920 barrels per day. There was then injected into the well 24 barrels of a 15% by weight aqueous hydrochloric acid solution at an injection pressure of 187 p.s.i. and at a rate of 1150 barrels per day followed by the injection of 79.5 barrels of field water at a pressure of 400 p.s.i. at a rate of 1182 barrels per day. The next day 63.8 barrels of 5% by weight guanidine hydrochloride in methanol were injected into the well at a pressure of 209 p.s.i. and an injection rate of 489 barrels per day. The well was permitted to remain quiescent for one day and then injection of field water was begun at a rate of 300 barrels per day and a pressure of 300 p.s.i. Water injection at this rate continued for four days before interruption to replace the injection pump packing. After a five day waiting period water injection was resumed and continued for 45 days at an injection rate of 100 barrels per day and a pressure of 875 p.s.i. During the next 202 days water injection was continued at a rate of about 40 barrels per day and a pressure of 1000 p.s.i.

Examples 3 and 4

Following the procedure of Example 1 above, two additional wells in the same field were treated as shown in the following table.

TABLE

| Treatment | Well B | | | Well C | | |
|---|---|---|---|---|---|---|
| | Rate, b./d. | Pump pressure | Amount, bbl. | Rate, b./d. | Pump pressure | Amount, bbl. |
| 5% wt. Guanidine HCl in CH$_3$OH | 557 | 420 | 70.7 | 525 | 1,000 | 76.5 |
| Field water | 5,410 | 715 | 75 | 2,060 | 950 | 50 |
| 15% wt. aq. HC | 4,230 | 950 | 23.4 | 2,940 | 975 | 22.5 |
| Field water | 3,480 | 920 | 72.5 | 4,240 | 980 | 50 |
| 5% wt. Guanidine HC in CH$_3$OH | 391 | 144 | 71.9 | 513 | 586 | 65.6 |

Treatment of wells B and C started on one day and continued the next day. After a 24 hour waiting period had elapsed subsequent to the final chemical treatment, field water injection was started in both wells at a rate of about 330 barrels per day each at pressure of about 350 p.s.i. After 53 days had elapsed both wells were being water injected at a rate of 100 bbls. a day each, pressure of 1050 p.s.i. for Well B and 825 p.s.i. for Well C.

Water injection into each well was continued for an additional 202 days. The injection rate over this period was about 30–35 barrels per day at a pressure of 1000 p.s.i. per well.

Obviously, many modifications and variations of the invention as hereinbefore set forth may be made without departing from the spirit and scope thereof, and therefore, only such limitations should be made as are indicated in the appended claims.

I claim:

1. A method of stabilizing a clay containing body which comprises contacting said body with a guanidine salt in a polar oxygenated aliphatic hydrocarbon solvent selected from the group consisting of a lower alkanol, dimethylsulfoxide, an admixture of dioxane and dimethylsulfoxide, and a mixture of said lower alkanols, and thereafter contacting the resulting treated clay-containing body with an aqueous solution of a mineral acid selected from the group consisting of hydrochloric acid, hydrofluoric acid, fluophosphoric acid and mixtures thereof.

2. A method as claimed in claim 1 wherein said guanidine salt is guanidine hydrochloride.

3. A method as claimed in claim 1 wherein said guanidine salt is guanidine acetate.

4. A method as claimed is claim 1 wherein the polar oxygenated aliphatic hydrocarbon is a lower alkanol.

5. A method as claimed in claim 4 wherein the lower alkanol is methanol.

6. A method as claimed in claim 1 wherein the polar oxygenated aliphatic hyrdocarbon solvent is dimethylsulfoxide.

7. A method as claimed in claim 1 wherein the polar oxygenated aliphatic hydrocarbon solvent is an admixture of methanol and ethanol.

8. A method as claimed in claim 1 wherein the polar oxygenated aliphatic hydrocarbon solvent is a mixture of 55 to 60 volume percent dioxane and 45 to 40 volume percent dimethylsulfoxide.

9. A method as claimed in claim 1 wherein said clay-containing body is adjacent a well bore, said guanidine salt is a guanidine hydrochloride and said solvent is methanol.

10. A method as claimed in claim 1 wherein said aqueous solution contains from 15 to 30% by weight of hydrochloric acid.

11. A method as claimed in claim 1 wherein said aqueous solution contains from 3 to 10% hydrofluoric acid and from 15 to 30% hydrochloric acid, on a weight basis.

12. A method of recovering oil from an oil bearing underground formation containing clay wherein a displacement fluid selected from the group consisting of water, steam and mixtures thereof is applied to said formation and oil is recovered therefrom which comprises introducing a treating solution consisting of a guanidine salt in a polar oxygenated aliphatic hydrocarbon solvent selected from the group consisting of a lower alkanol, dimethylsulfoxide, an admixture of dioxane and dimethylsulfoxide, and a mixture of said lower alkanols into said formation, contacting said clay with said treating solution, then contacting said formation with an aqueous solution of a mineral acid selected from the group consisting of hydrochloric acid, hydrofluoric acid, fluophosphoric acid and mixtures thereof, said treatment and contacting steps being effective to stabilize said clay-containing body against water damage thereto, and thereafter introducing said displacement fluid into said formation under pressure to force said treating and said contacting solutions through the formation and recovering oil from said formation.

13. A method as claimed in claim 12 wherein said guanidine salt is guanidine hydrochloride.

14. A method as claimed in claim 12 wherein said guanidine salt is guanidine acetate.

15. A method as claimed in claim 12 wherein the polar oxygenated aliphatic hydrocarbon solvent is a lower alkanol.

16. A method as claimed in claim 12 wherein the lower alkanol is methanol.

17. A method as claimed in claim 12 wherein said aqueous solution of mineral acid contains from 10 to 30% by weight of hydrochloric acid.

18. A method as claimed in claim 12 wherein said aqueous solution contains from 3 to 10% of hydrofluoric acid and from 15 to 30% of hydrochloric acid, on a weight basis.

References Cited

UNITED STATES PATENTS

| | | | |
|---|---|---|---|
| 2,761,843 | 9/1956 | Brown et al. | 252—8.55 |
| 2,839,466 | 6/1958 | Shock et al. | 166—42 X |
| 3,036,630 | 5/1962 | Bernard et al. | 166—42 X |
| 3,131,759 | 5/1964 | Slusser et al. | 166—42 X |
| 3,236,306 | 2/1966 | Atwood | 166—42 |
| 3,360,043 | 12/1967 | Braden et al. | 166—9 |
| 3,389,750 | 6/1968 | Bohr et al. | 166—9 |

STEPHEN J. NOVOSAD, *Primary Examiner.*

U.S. Cl. X.R.

166—300, 303

UNITED STATES PATENT OFFICE
CERTIFICATE OF CORRECTION

Patent No. 3,444,931                             May 20, 1969

William B. Braden, Jr.

It is certified that error appears in the above identified patent and that said Letters Patent are hereby corrected as shown below:

Column 4, line 29, "had" should read -- has --. Column 5, in the table, first column, line 4 thereof, "15% wt. aq. HC" should read -- 15% wt. aq. HCl --; same table, first column, lines 6 and 7 thereof, "5% wt. Guanidine HC in $CH_3OH$" should read -- 5% wt. Guanidine HCl in $CH_3OH$ --.

Signed and sealed this 21st day of April 1970.

(SEAL)
Attest:

Edward M. Fletcher, Jr.                       WILLIAM E. SCHUYLER, JR.
Attesting Officer                                  Commissioner of Patents